(12) United States Patent (10) Patent No.: US 10,902,425 B2
Cantrell et al. (45) Date of Patent: Jan. 26, 2021

(54) SYSTEM AND METHOD FOR BIOMETRIC CREDIT BASED ON BLOCKCHAIN

(71) Applicant: Walmart Apollo, LLC, Bentonville, AR (US)

(72) Inventors: Robert Cantrell, Herndon, VA (US); David M. Nelms, Rogers, AR (US); Sid Shake, Rogers, AR (US); Charles Lobo, Cave Springs, AR (US); Donald R. High, Noel, MO (US); Todd Mattingly, Bentonville, AR (US); Brian McHale, Oldham (GB); John J. O'Brien, Farmington, AR (US); Bruce Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 75 days.

(21) Appl. No.: 16/224,210

(22) Filed: Dec. 18, 2018

(65) Prior Publication Data

US 2019/0205889 A1 Jul. 4, 2019

Related U.S. Application Data

(60) Provisional application No. 62/611,755, filed on Dec. 29, 2017.

(51) Int. Cl.
*G06Q 20/40* (2012.01)
*H04L 9/32* (2006.01)
(Continued)

(52) U.S. Cl.
CPC ....... *G06Q 20/40145* (2013.01); *G06Q 20/24* (2013.01); *G06Q 20/389* (2013.01);
(Continued)

(58) Field of Classification Search
CPC .............................................. G06Q 20/40145
(Continued)

(56) References Cited

U.S. PATENT DOCUMENTS 6,202,151 B1 3/2001 Musgrave et al.
8,485,442 B2 7/2013 McNeal
(Continued)

FOREIGN PATENT DOCUMENTS

WO 2016120826 A2 8/2016

OTHER PUBLICATIONS

Preventing identity theft using biometrics based authentication system (Year: 2017).*
(Continued)

*Primary Examiner* — Bruce I Ebersman
*Assistant Examiner* — John A Anderson
(74) *Attorney, Agent, or Firm* — Jeffri A. Kaminski; Venable LLP

(57) ABSTRACT

An example method for performing concepts disclosed can include: obtaining a first authentication factor including first biometric data of a user; hashing the first authentication factor to create a first hash; registering the user with a digital credit system using the created first hash; obtaining a second authentication factor including second biometric data of the user; hashing the second authentication factor to create a second hash; comparing the first hash and the second hash; and proceeding the transaction based on the comparison.

4 Claims, 7 Drawing Sheets

(51) Int. Cl.
*G06Q 20/38* (2012.01)
*G06Q 20/24* (2012.01)

(52) U.S. Cl.
CPC ....... *G06Q 20/3827* (2013.01); *H04L 9/3231* (2013.01); *H04L 9/3236* (2013.01); *H04L 9/3239* (2013.01); *H04L 2209/38* (2013.01); *H04L 2209/56* (2013.01)

(58) Field of Classification Search
USPC .......................................................... 705/44
See application file for complete search history.

(56) References Cited

U.S. PATENT DOCUMENTS

| | | |
|---|---|---|
| 2008/0172342 A1 | 7/2008 | Keane et al. |
| 2008/0209227 A1* | 8/2008 | Venkatesan ........... H04L 9/3231 713/186 |
| 2013/0317991 A1 | 11/2013 | Groat et al. |
| 2016/0191513 A1* | 6/2016 | Tomlinson .............. H04L 9/321 |
| 2016/0203306 A1 | 7/2016 | Boshra |
| 2016/0277380 A1 | 9/2016 | Wagner et al. |
| 2017/0046694 A1 | 2/2017 | Chow et al. |
| 2017/0085562 A1* | 3/2017 | Schultz ............... H04L 63/0861 |
| 2017/0193214 A1 | 7/2017 | Shim et al. |
| 2017/0243213 A1 | 8/2017 | Castinado et al. |
| 2017/0256000 A1 | 9/2017 | Isaacson et al. |
| 2017/0316390 A1* | 11/2017 | Smith ................... H04L 9/0861 |
| 2018/0285879 A1* | 10/2018 | Gadnis ................. H04L 9/3231 |

OTHER PUBLICATIONS

Observa, "What are smart contracts and how will they affect retail?", Aug. 3, 2017, pp. 1-4.
Alan Morrison, "Blockchain and smart contract automation: an introduction and forecast", Mar. 10, 2016, pp. 1-4.
International Search Report and Written Opinion dated Mar. 15, 2019, issued in corresponding PCT Application No. PCT/US2018/066243.

* cited by examiner

SYSTEM AND METHOD FOR BIOMETRIC CREDIT BASED ON BLOCKCHAIN

CROSS REFERENCE TO RELATED APPLICATION

This patent application claims the benefit of U.S. Provisional Application No. 62/611,755, filed Dec. 29, 2017, content of which is incorporated by reference herein.

BACKGROUND

1. Technical Field

The present disclosure relates to payment transactions, and more specifically to systems and methods for biometric credit based on blockchain.

2. Introduction

Biometric information, such as fingerprints, the shape of palm, the eye (iris and retina), the shape of the face, voice, or signature dynamics (e.g., speed of movement of pen, accelerations, pressure exerted, inclination), may allow a person to be identified and authenticated. For example, sampled biometric information of a person (referred to as a biometric template) may be stored in a database and compared to the person's biometric data for authentication. As such the person's identity can be verified based on a resemblance between the biometric template and the received biometric data of the person.

Blockchain technology is a peer-to-peer authentication system for valuable digitized items that allows online interactions directly between two or more parties without going through one or more trusted intermediaries. It may involve a peer-to-peer network and timestamps actions that are hashed into an ongoing chain of hash-based proof-of-work code to form a record that cannot be changed without redoing the proof-of-work. The longest chain distributed on the peer-to-peer network proves that the data must have existed at the time in order to get into the hash, thereby proving the sequence of events witnessed, thereby proving the integrity of the digitized document has been maintained. The blockchain technology can allow digitized item use as intended based on cryptographic proof instead of trust, allowing any two or more willing parties to employ the content without the need to trust each other and without the need for a trusted third party.

Current Blockchain systems cannot provide a biometric credit system. What is needed herein, are systems and methods for biometric credit based on blockchain to facilitate payment transactions, for example, for store or online purchases.

SUMMARY

A system configured as disclosed herein can include a first computing device having a first biometric data capturing unit and configured to: capture first biometric data of a user via the first biometric data capturing unit; receive a first authentication factor including the first biometric data of the user; and transmit the first authentication factor to a second computing device; a second computing device configured to: receive and store the first authentication factor from the first computing device; hash the first authentication factor to generate a first hash; and register the user with a digital credit system using the first hash, wherein the first hash is associated with an account of the user in the digital credit system, and a third computing device having a second biometric data capturing unit and configured to: capture second biometric data of the user via the second biometric data capturing unit; receive a second authentication factor including the second biometric data of the user; and transmit the second authentication factor to the second computing device. The second computing device is further configured to: receive the second authentication factor from the third computing device; hash the second authentication factor to generate a second hash; and compare the second hash with the first hash. The third computing device is further configured to: receive the comparison between the first hash and the second hash; and proceed a transaction initiated by the user based on the comparison.

Another system configured as disclosed herein can include a first computing device having a first biometric data capturing unit and configured to: capture first biometric data of a first user via the first biometric data capturing unit; generate a first authentication factor including the first biometric data of the first user; hash the first authentication factor to generate a first hash; initiate the multi-party transaction using the first hash. A second computing device having a second biometric data capturing unit and configured to: capture second biometric data of a second user via the second biometric data capturing unit; generate a second authentication factor including the second biometric data of the second user; hash the second authentication factor to generate a second hash; respond to the multi-party transaction using the second hash. And a third computing device having a third biometric data capturing unit and configured to: capture third biometric data of a third user via the third biometric data capturing unit; generate a third authentication factor including the third biometric data of the user; and hash the third authentication factor to generate a third hash; and process the multi-party transaction using the third hash. The first, second and third users are involved in the multi-party transaction.

A method for performing concepts disclosed herein can include: obtaining a first authentication factor including first biometric data of a user; hashing the first authentication factor to create a first hash; registering the user with a digital credit system using the created first hash; obtaining a second authentication factor including second biometric data of the user; hashing the second authentication factor to create a second hash; comparing the first hash and the second hash; and proceeding the transaction based on the comparison.

Additional features and advantages of the disclosure will be set forth in the description which follows, and in part will be obvious from the description, or can be learned by practice of the herein disclosed principles. The features and advantages of the disclosure can be realized and obtained by means of the instruments and authentications particularly pointed out in the appended claims. These and other features of the disclosure will become more fully apparent from the following description and appended claims, or can be learned by the practice of the principles set forth herein.

DETAILED DESCRIPTION

Figure 1:
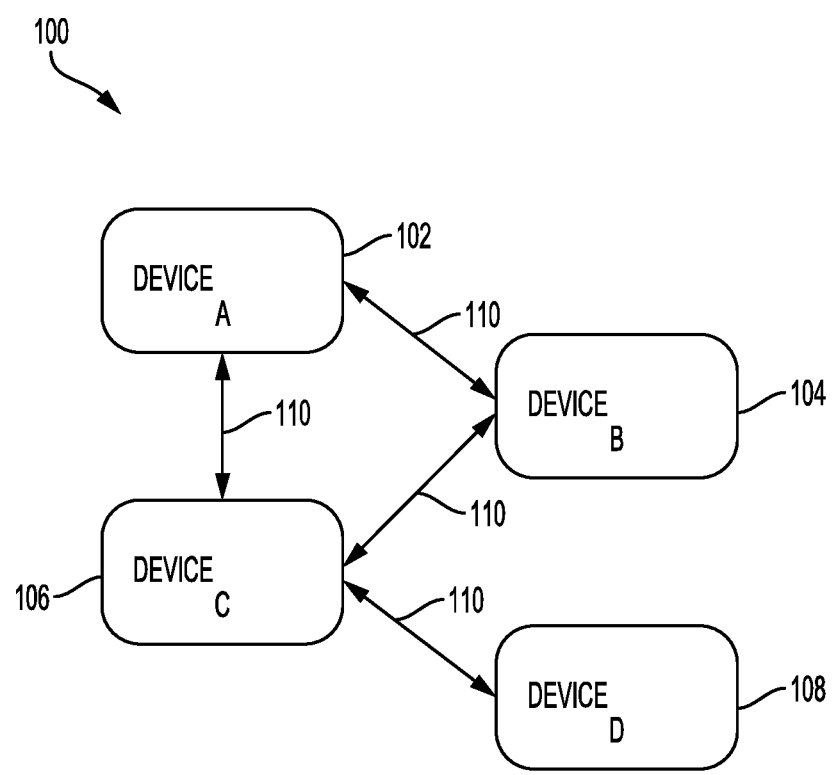
FIG. 1 illustrates an exemplary mesh network between devices according to one embodiment.

Systems and methods according to this disclosure can allow a person to be treated as a "credit card" to their own bank or other financial accounts based on pre-approved biometric (e.g., fingerprint or eye pattern) credit of the person. Transactions can occur without requiring cash or a physical credit card and without the fees of credit cards and the burdens of cash. Specifically, a biometric scan of the person can generate a hash which may be used for subsequent transactions. This hash may be linked to the person's account. The disclosed biometric system can recognize the person based on the biometric data and then authorize the various money services that the person may wish to partake of, for example pay for goods purchased, transfer funds, and receive funds, etc. Further, a customer, once recognized using the biometric system, may purchase age restricted items and obtain prescription items from a pharmacy.

In some embodiments, the disclosed systems and methods may apply to a multiple-party transaction. For example, a three-party transaction may include a customer, an associate in a store, and a manager of the store, who are all involved in the receipt of returned products. The customer may provide his biometric hash, as may the receiving associate in the store and the approving manager. Similarly, when a customer attempts to purchase age restricted products, an associate at a POS (point of sale) must currently be over 21 years old. The disclosed system can allow the customer to provide his biometric hash as would the under-age associate in the store and the approving (over 21) manager.

Another use case of the disclosed systems and methods may be for a child's purchase of items which may have been restricted on their parents account. The disclosed system allows a parent to provide their biometric hash and the child to provide theirs in order to complete the transaction.

Another example of involving multiple parties that can employ the disclosed systems and methods herein, may allow for roommates to pool their money for purchases and approve the purchase of one roommate while the other(s) are remote. The remote roommates may provide their approval of the transaction using their biometric hash information by employing a smart device with a biometric reader.

The systems and methods disclosed herein can allow remote digital authentication. Blockchain can be combined with biometric information to allow a user to become a biometric credit card. In addition, the disclosed systems and methods may allow a user A to connect with another user B at a self-checkout station or a kiosk and request payment from their smart devices, which can be offsite.

Systems disclosed herein can be a biometric credit payment system. A customer may register to a retailer's digital credit system. The registration process can create a customer account including typical registration information, such as name, age, address, passwords, etc. Biometric information of the customer, such as an iris, fingerprint, palm print, hand geometry, or facial scan, can be further obtained. A hash may be created from one or more pieces of the biometric information. The customer's account is created and the hash is associated with the customer's account. Accounts may also be created for store employees and other individuals. In an example, the customer may be in a store of the retailer to complete a transaction. The transaction is created and associated with the customer's account. The transaction may be set up to require multi-party approval. The hashes of biometric information for the multiple parties should be confirmed to complete the transaction. For example, to set up the transaction, a smart contract with the customer's biometric hash may be created. The other parties may scan their biomarker (biometric data) to get access to their accounts and crypto currency they are about to transfer to the customer. The smart contract may also have an expiration time. An application running the smart contract may be installed on a device with a biometric sensor, a global positioning system (GPS) sensor and clock. For the customer to purchase items from the store, the customer may be physically at the store, and be confirmed by scanning their biomarker. The smart contract may use these biometric inputs to generate a transfer of crypto currency to the customer's account with a time window to spend the crypto currency. The hash of the customer's biometric information can also be used by store employees to approve transactions.

In some embodiments, a transaction request, can, for example, be broadcast through a mesh or peer-to-peer network between devices (e.g., device for customer A, device for customer B, device for store associate, device for store manager, and cloud-based database), until all the devices within a group, or within a radius of the initial requesting device, have received the request. As devices receive the request, responses to the request are generated and sent back to the requesting device, each response providing an answer as to how to fulfill transaction the request. The requesting device receives the responses, aggregates and analyzes the responses, and determines how to transition information and resources to proceed with the transaction based on the responses. In some cases, this can require transferring information from the requesting device to another device through the peer-to-peer network.

In some cases, a peer-to-peer authentication may be required that allows online interactions directly between devices without going through one or more trusted intermediaries. Such a peer-to-peer network can timestamp actions (e.g., sending a transaction request from device A to device B), hashing the actions into an ongoing chain of hash-based proof-of-work code to form a record that cannot be changed without redoing the proof-of-work. The longest chain distributed on the peer-to-peer network proves that the data must have existed at the time in order to get into the hash, thereby proving the sequence of events witnessed. The integrity of the digitized document has been maintained. In an exemplary embodiment, the authentication may utilize one or more aspects of conventional blockchain. The authentication may allow any two or more willing parties (e.g., a customer, a store associate, and a store manager) to employ the content (e.g. approval or deny of a returned product), without the need to trust each other and without the need for a trusted third party.

In some configurations, communications between devices (e.g., device for roommate A, device for roommate B, and device for roommate C) can take the form of a blockchain, where each request and response made by devices can be added to a blockchain ledger. As any device takes an action (e.g., sending a transaction request, sending a response to a transaction request, or sending capabilities of handling a transaction), that action information is added to the blockchain. More specifically, the request, response, or other action is hashed into the previous blockchain. This new, updated blockchain is then distributed to the other devices within the group.

The devices in the peer-to-peer network may be a communication device, a database device, or any other electronic device that may be used by a user. For example, in one configuration the devices sending a transaction request may be an electronic device (e.g., a smartphone or a computing tablet) used by a user who initiates the transaction. In another configuration the devices may be smart home devices that are configured with capabilities of responding to a transaction request. In yet another configuration, the devices may be distinct types of devices, such as a kiosk in a retailer store and smart home devices, for communicating, making requests, and generating responses to those requests.

The information (e.g., transaction requests, capabilities of handling transaction requests, and responses to transaction requests) shared between devices will do so in a peer-peer network of devices that is decentralized. That is, all devices have the potential for sharing and distributing information on transactions. This system can be authenticated, shared, and managed, by a block chain system for authentication and decentralization. For instance, if a child plans to purchase an age restricted item for his family, the child can relay an initial block chain of information, as a transaction request, to all other devices in the group. This request can contain name of the item to be purchased, price of the item, quantity of the item, type of the item, expiration date of the item, name of store where the item is to be purchased, time stamp, digital currency information, authentication information, etc. The request may also contain supplemental information, such as "is the store in a location near home?" Other devices within the group may receive and authenticate the transmission, then may provide additional information to respond to the transaction request. For example, a parent in the group may provide his or her approval for purchasing the item, and another parent in the group may prefer to change the quantity of the item. Finally, a store device in the store within the group may complete the transaction based on the responses from other devices. This in turn causes an update to the previous block within the blockchain, which will contain the "slave" (second) device's updates with the original "master" initial block (the transaction request). Thus, information will be accurately shared between the devices with the necessary information, including updates, etc.

By sharing the data and information between devices, the devices can communicate and coordinate dynamically to ensure handling the transactions timely, securely, and accurately. The data and information would be stored in a distributed ledger using blockchain technology. For example, devices can have an active, ongoing communication to store and update the information as to the transaction. A device needs to broadcast to other devices of the group its request and response. By using such blockchain technology, an immutable trail can be created, and a token could only be spent and reserved once, thus removing change of duplicity.

In some embodiments, a user of a device in the group may be authenticated to access the distributed ledger based on the user's biometric data. The device may be configured to have capabilities of capturing the biometric data of the user. For example, a camera may be provided on the device for capturing a shape of the user's face. The captured biometric data may be further processed by an application installed on the device, for example hashing the captured face shape. The captured biometric data may also be transmitted to other device, for example a database device, for further processing, such as hashing the biometric data. The other device may be a device within the same group, or may be a device outside the same group. The other device may further send the processed biometric data back to the device that generates the original biometric data. As such, a transaction request or a response to the transaction request may further contain hashed biometric data of that user. Each block or one block of the blockchain may contain hashed biometric information of all device users, such that each user of the blockchain can be authenticated and verified to transfer, alter, or otherwise act on the transaction information. In some cases, hashed biometric information of all device users may be stored on a device, such as a database device, instead of in the block of the blockchain. In such case, the block of the blockchain may contain a reference to the hashed biometric information of all device users.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth. The disclosure now turns to FIG. 1.

FIG. 1 illustrates an exemplary mesh/peer-to-peer network 100 between devices. Devices 102, 104, 106, and 108 can communicate with one another. A mesh network 100 such as that illustrated is a network where each node can relay data from and to other nodes within the network. While mesh networks can be constructed to operate in wired conditions, they are more prevalent in wireless configurations, where messages can be broadcast/flooded to other nearby nodes (i.e., not sent to a specific node, but rather all nodes within a given distance of the broadcasting node). When a receiving node is located outside the broadcast range of a transmitting node, intermediate nodes may be required to route the transmission to the receiving node. For example, as illustrated, node 102 can communicate 110 with node 106, and node 104 can communicate 110 with node 106. However, nodes 102 and 108 cannot communicate with each other. Because node 102 can only communicate with node 106, any communications 110 between node 102 and node 108 must route through node 106.

A user of the device 102 may initiate a transaction request. For example, the user may be a roommate who pools money from two other roommates for purchasing an item in a retailer store while the two other roommates are remote. The device 102 may communicate its' transaction request to the devices 104 and 106 that may be used by the two other roommates respectively. The transaction request may include name and quantity of the item to be purchased, unit price of the item, category of the item, expiration date of the item, the amount of money requested from each of the two roommates, and so on. The transaction request may be broadcast to device 108 that may be a device in the retailer store, for example a POS machine.

The devices 104 and 106 may broadcast their respective responses to the transaction request to other devices in the group. The respective response may include approval or denial of the transaction, acceptance of the amount of money requested, and modification of the transaction (e.g., decrease or increase the quantity of the item, and add another item to the transaction). The transaction request may also include biometric data of the user of the device 102. The biometric data may be obtained and processed by suitable hardware and software configured on the device 102, for example, a fingerprint scanner and associated processing applications. The biometric data may be linked to a bank or financial account of the user from which funding can be withdrawn to pay for the transaction. In such a case, the biometric data can be verified to authenticate the user, such that no physical credit card or cash is required from the user for completing the transaction. Accordingly, the respective responses may also include the respective biometric data of the two other roommates that are obtained and processed by suitable hardware and software configured on the devices 104 and 106, for example, fingerprint scanners and associated processing applications. The biometric data may be linked to a respective bank or financial account of the two other roommates from which funding can be withdrawn to pay for the transaction. In such a case, the biometric data can be verified to authenticate the two other roommates, such that no physical credit card or cash is required from the two other roommates for completing the transaction.

In some embodiments, the device 102 may further broadcast its response to other devices based on the received responses. For example, if one of the roommates does not agree to complete the transaction, the device 102 may broadcast a response indicating the device 102 can cover the amount of money initially requested from the one roommate.

The device 108, such as a POS machine in the retailer store, may process the transaction based on the respective responses from the devices 102, 104 and 108. For example, the device 108 may cancel the transaction due to a denial of the transaction from one of the devices 104 and 106. The device 108 may proceed to complete the transaction by withdrawing payment for the transaction from the bank or financial accounts associated with the three roommates. The device 108 may broadcast to other devices the completion of the transaction. Via the mesh network 100, the devices 102, 104, 106, and 108 can transmit, receive, and relay messages between themselves as necessary.

Figure 2:
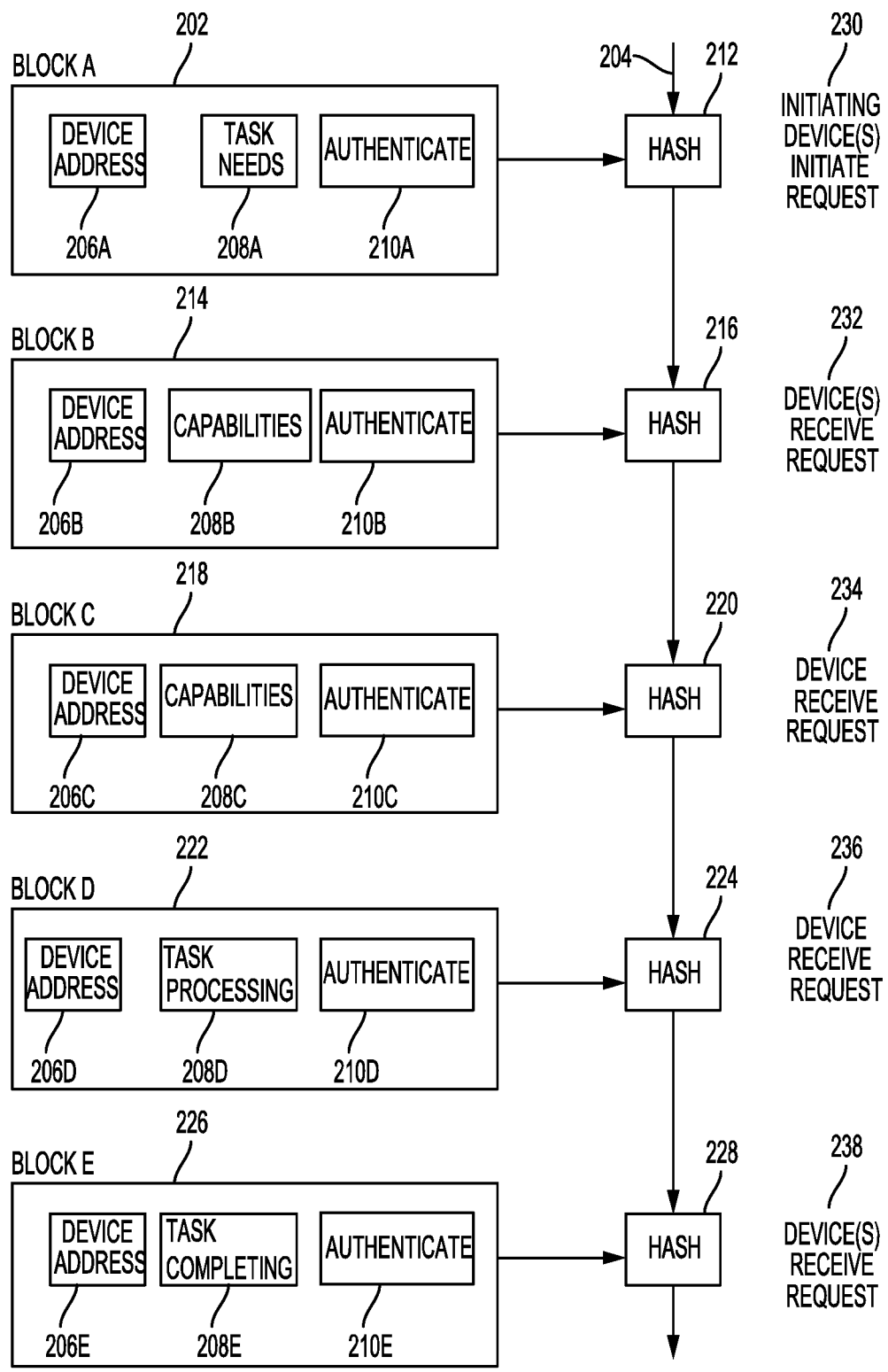
FIG. 2 illustrates an exemplary blockchain based on interactions between devices according to embodiment.

FIG. 2 illustrates an exemplary blockchain based on interactions between the devices 102, 104, 106 and 108. A blockchain is a distributed digital ledger which is communicated electronically between devices. Each transaction recorded within the digital ledger is a block which can be hashed or otherwise encrypted. As new transactions are added to the digital ledger, each transaction's veracity can be tested against the previous ledger stored by the devices, and can, in some configurations, require confirmation from a defined percentage (usually 50%) of the devices to be added to the blockchain.

In the case where three users (e.g., three roommates) pool their money for purchasing items, the blockchain can take the form illustrated in FIG. 2. In this example, there is a blockchain 204 which has been distributed among multiple devices, such as the devices 102, 104, 106, and 108. One of the devices, an initiating device such as the device 102, initiates a purchase of an item from a retailer store such as the POS device 108, and proceeds to initiate a task request 230. Initiation of the task request, in this example, includes generating a block (Block 202). In this example, the block 202 added to the blockchain contains the device address 206A or identification of the device 102 making the task request, or otherwise communicating with the remaining devices in the group of devices. The block 202 can contain the task needs 208A, which can include the specific request for resources for purchasing the item, item's requirements, or actions, etc. The specific request for resources may include the total amount of money needed to purchase the item, a percentage of the total amount of money that each user is required to pay, and a time frame within which the item needs to be purchased. The item requirements may include a unit price of the item, a quantity of the item, a name of the item, dimensions of the item, weight of the item, manufacture of the item, type of the item (food, furniture, or appliance), warranty information of the item, etc.

In addition, the block 202 can contain an authentication 210A portion, where the device can approve or authenticate the validity of other transactions and/or provide authority for the present transaction. The block 202 may include a private key that may be associated with a bank or financial account of the user of the device 102. In normal cryptocurrency, a private key may be stored somewhere, for example, in a digital wallet, which requires significant effort to protect the private key from being stolen or hacked. In this example, the private key is not stored anywhere, and is regenerated every single time from biometric data or a combination of biometrics and other things, such that there's nothing to hack. The private key can be generated by hashing the biometric data as an input such that the user's personhood is the private key.

In some embodiments, the biometric data are not used as a verifier (e.g., a gatekeeper) before a private key stored in a wallet can be accessed. The biometric data may be combined with other factors (e.g., a combination of multi-factors) as a multi-factor input to a hash algorithm to hash out the private key. The multi-factor input may be required to be the same every single time so that the exact same hash key can be generated to act as the private key. An example of the multi-factor input may include a face ID combined with a phrase. For example, when an account is set up, a smart phone may be used to generate a face ID that may be combined with a spoken phrase and a code entered. The combination of those three factors can be used as an input to generate a hashed private key. The private key may be regenerated every single time in order to access records to do a transaction.

In some embodiments, a two-level security may also be included in the block 202. A multi-factor authentication may be used as a first-level security to get past authentication of the first level before getting to where biometric data or a combination thereof is used as an input to generate a hashed private key. The multi-factor authentication for the first level security may be an email address of the user, a password of the user, or a combination thereof. The hashed private key may be considered as a second-level security that would provide another layer of protection for an account. In such a way, even if the gate may be passed, the private key is unable to be hashed out unless the biometric data, the spoken phrase and the code are known. Thus, the public ledger may be read, but not knowing what the private key hash is, nothing can be accessed from the public ledger. The hashed private key can be used to protect the blocks of the blockchain from being accessed. An example of the first-level security may use proximity as one of the verifiers to check the gate. For example, the user may only be in one place at one time.

In some embodiments, a combination of multi-factor verification may be a combination of a face ID, a thumb fingerprint and/or a touch ID, or a phrase said whenever the account is set up. The combination may also depend on what hardware a device includes.

In some embodiments, a hashed private key that is generated when setting up the account may be printed out and placed in, for example, a safety deposit box. In such a way, a device can be completely off network until it is ready to use. Further, it does not prevent a user from being able to do transactions. In the event the biometric data used to generate the hashed private key is no longer available, the hashed private key in the safety deposit box can be used to access back the account and generate a different set of biometrics. In some embodiments, the hashed private key is not stored in the network anywhere except at the point of the transaction.

As the device 102 generates the block 202 for the initial task request, the block 202 is hashed 212 into the previous blockchain 204, resulting in an updated blockchain which is distributed among the devices 102, 104, 106 and 108 in the group. The other devices receive the updated blockchain containing the request 232, and generate block 214 in response to the request. These responses are hashed 216 into the blockchain.

The block 214 may be generated by the device 104. The block 214 added to the blockchain can contain the device address 206B or identification of the device 104 making the response to the task request, or otherwise communicating with the remaining devices in the group of devices. The block 214 can contain the capabilities 208B, which can include the specific capabilities of a user of the device 104, can provide for approving or denying the transaction request from the device 102, and may also include actions for modifying the transaction such as adding or removing one or more items from the transaction request, etc. The capabilities may include a maximum amount of money that can be contributed to the transaction (e.g., "can provide $100 at maximum"), a color of the item that can be accepted (e.g., "can accept white color only"), a quantity of the item that can be accepted (e.g., "can accept up to 10 items"), and a type of item that can accept (e.g., "cannot accept food expiring within 10 days from purchasing). The capabilities may also include supplemental capabilities such as allowing a direct delivery of the item to a location.

In addition, the block 214 can contain an authentication 210B portion, where the device 104 can approve or authenticate the validity of other transactions and provide authority for the present transaction. The block 214 may include a private key that may be associated with a bank or financial account of the user of the device 104. In normal cryptocurrency, a private key may be stored somewhere, for example, in a digital wallet, which requires much efforts to protect the private key from being stolen or hacked. In this example, the private key is not stored anywhere, and is regenerated every single time from biometric data or a combination of biometrics and other things, such that there's nothing to hack. The private key can be generated by hashing the biometric data as an input such that the user's personhood is the private key. The block 214 may also perform other similar operations as the block 202 does.

Similarly, the other devices receive the updated blockchain containing the request 234, and generate block 218 in response to the request 234. These responses are hashed 220 into the blockchain. The request 234 may include the transaction request 230 and the request 232 from the device 104.

The block 218 may be generated by the device 106. The block 218 added to the blockchain can contain the device address 206C or identification of the device 106 making the response to the task request from the device 102 and capabilities response from the device 104, or otherwise communicating with the remaining devices in the group of devices. The block 218 can contain the capabilities 208C, which can include the specific capabilities of a user of the device 106 that can provide for approving or denying the transaction request from the device 102 and capabilities response from the device 104. The capabilities may also include actions for modifying the transaction such as adding or removing one or more items from the transaction request, etc. The capabilities may include a maximum amount of money that can be contributed to the transaction (e.g., "can provide $50 at maximum"), a color of the item that can be accepted (e.g., "can accept red color only"), a quantity of the item that can be accepted (e.g., "can accept up to 5 items"), and/or a type of item that can accept (e.g., "cannot accept food expiring within 5 days from purchasing). The capabilities may also include supplemental capabilities such as requiring assembly of the item upon delivery.

In addition, the block 218 can perform other similar operations as the block 202 does, for example, an authentication 210C portion, where the device 106 can approve or authenticate the validity of other transactions and provide authority for the present transaction.

The updated blockchain containing block 218 is broadcast by the device 106 to other devices in the group. In some embodiments, the device 102 may act as a device for receiving the request 236. The request 236 may be stored in a block 222 created by the device 102. The block 222 may be subsequently hashed 224 and added to the blockchain. The block 222 added to the block chain can contain the device 102 address 206D or identification of the device 102 making the response to the responses from the devices 104 and 106, or otherwise communicating with the remaining devices in the group of devices. In such scenario, the task processing 208D of the block 222 may include responses by the device 102 to the received responses from the devices 104 and 106. For example, the initial task needs may be modified and updated based on the responses received from the devices 104, and 106. The modifications of the initial task needs may include, but are not limited to, adding one or more items to the transaction request, removing one or more items from the transaction request, and/or changing the amount of money pooled from the devices 104 and 106. In addition, the block 222 can contain an authentication 210D portion, where the device 102 can approve or authenticate the validity of other transactions and/or provide authority for the present transaction, as described above.

The transaction (task) may be completed by the device 108 as a device to receive request 238. The request 238 may be stored in a block 226 created by the device 108. The block 226 may be subsequently hashed 228 and added to the blockchain. The block 226 added to the block chain can contain the device 108 address 206E or identification of the device 108 making the response to the task request, or otherwise communicating with the remaining devices in the group of devices. In this example, the device 108 may be a POS machine in a retailer store where the user of the device 102 is shopping for the item. The transaction may be completed based on the responses stored in the updated blockchain. For example, payment for the item(s) may be withdrawn from the respective bank or financial accounts of the users, an electronic receipt may be issued, etc. The completed transaction information can be stored in the task completing 208E of the block 226. In addition, the block 226 can contain an authentication 210E portion, where the device 108 can approve or authenticate the validity of other transactions and provide authority for the present transaction.

The block 226 may include a private key that may be associated with a bank or financial account of the retailer store. In normal cryptocurrency, a private key may be stored somewhere, for example, in a digital wallet, which requires significant effort to protect the private key from being stolen or hacked. In this example, the private key is not stored anywhere, and is regenerated every single time from biometric data or a combination of biometrics and other things, such that there's nothing to hack. The private key can be generated by hashing the biometric data as an input such that the user's personhood (e.g., a store associate) is the private key.

In some embodiments, biometric data may be associated with money services that a business offers to its customers, for example, money transfer, check cashing, and so forth. For such money services, it may take a significant amount of time to authenticate a customer by virtue of, for example looking at the driver's license of the customer or looking at the data that is typed in. In such cases, biometric data of the customer (e.g., fingerprint) may be used to authenticate the customer without having to even request for the driver's license. The biometric data of the customer may be obtained from phones that have fingerprint scanners, or a face ID recognition.

Figure 3A:
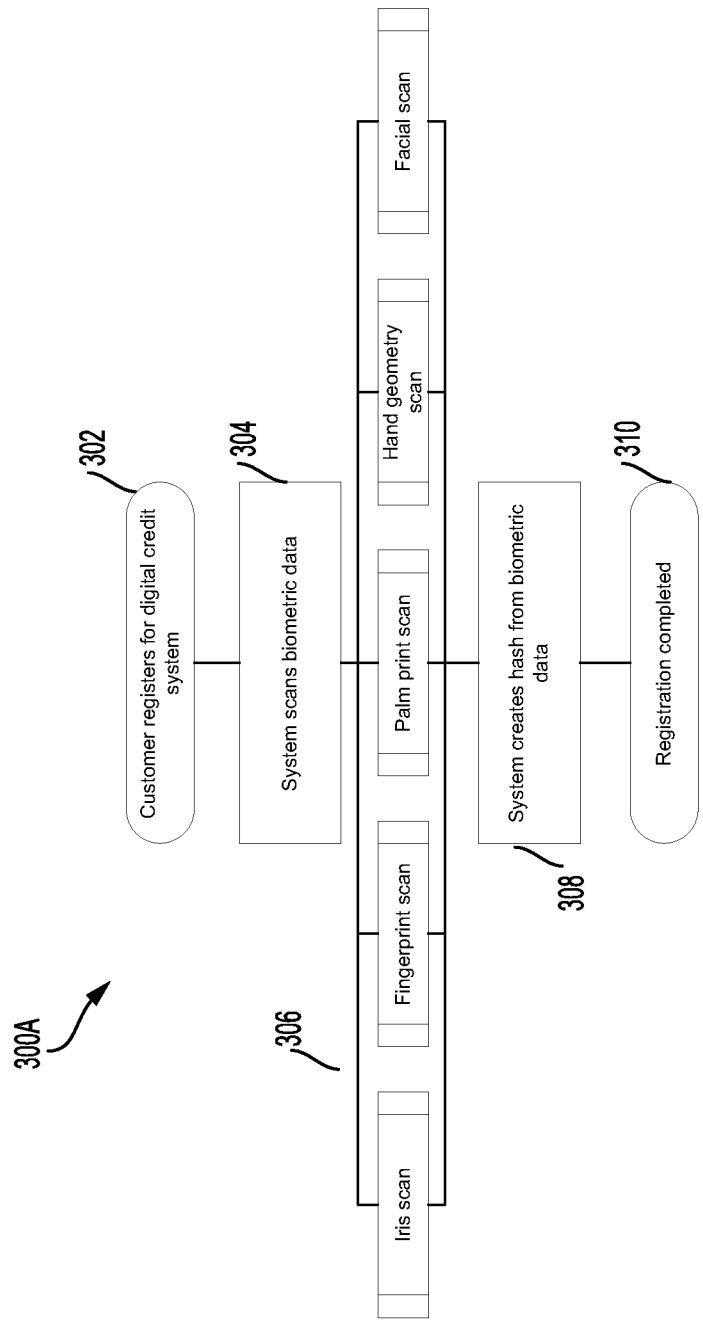
FIG. 3A illustrates a block diagram for a logic flow of biometric data registration according to one embodiment.

FIG. 3A illustrates a block diagram 300A for a logic flow of biometric data registration according to one embodiment. In this example, a customer may register for a digital credit system (block 302). The disclosed system may obtain the customer's biometric data by, for example, scanning a portion of the customer (block 304). The biometric data may include, but is not limited to, iris, fingerprint, palm print, hand geometry, and/or facial images (block 306). The disclosed system may further hash the scanned biometric data to create a hash corresponding to the scanned biometric data (block 308). The generated hash may be stored on a remote server (e.g., a cloud-based database server) or a local server or computing device. Registration of the customer can be completed (block 310).

Figure 3B:
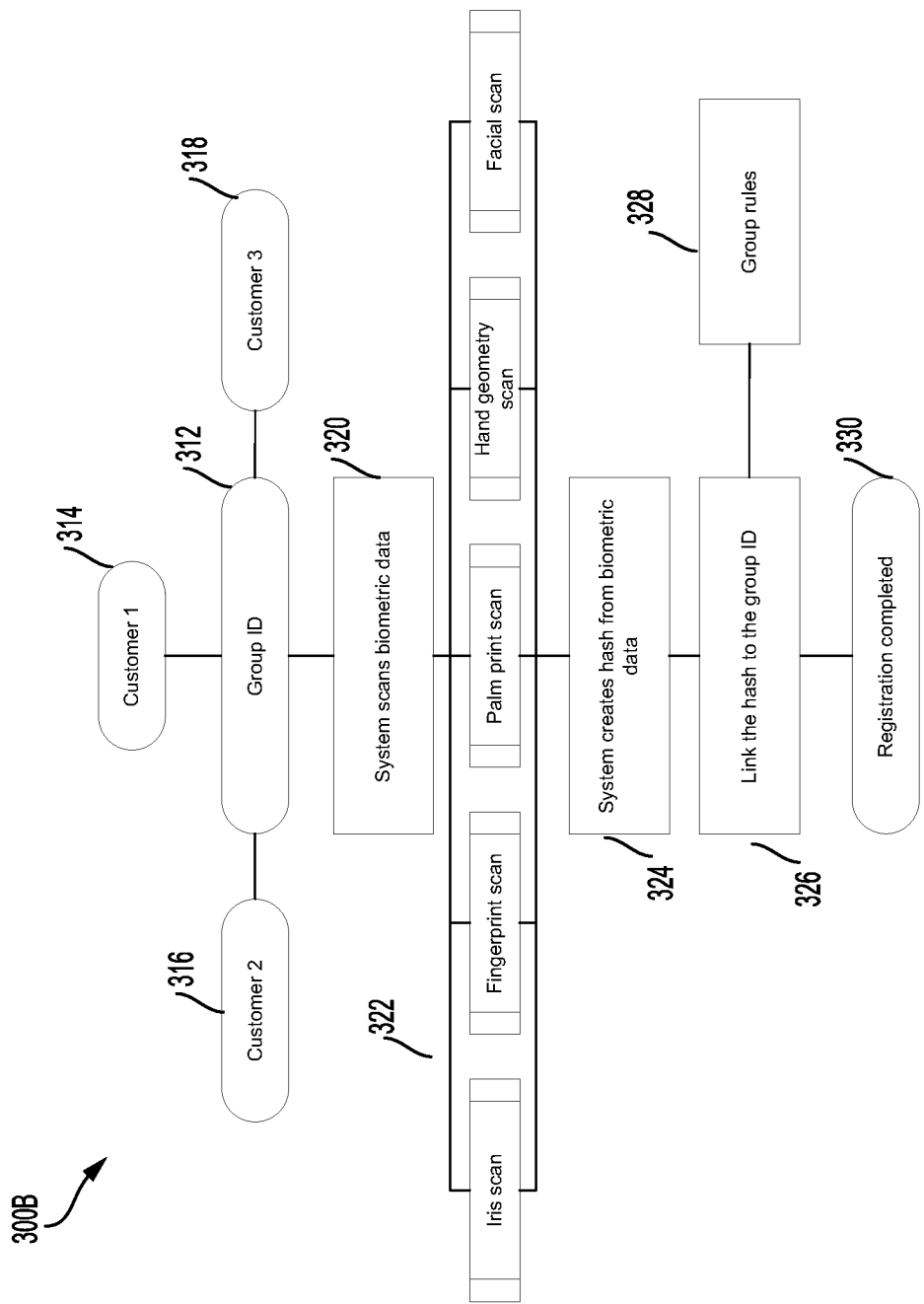
FIG. 3B illustrates a block diagram for a logic flow of biometric data registration according to another embodiment.

FIG. 3B illustrates a block diagram 300b for a logic flow of biometric data registration according to one embodiment. In this example, a group ID for a group of customers of a retailer may be generated (block 312). The group of customers may include two or more classmates, or two or more friends, or two or more roommates, or two or more family members, for example, customer1 (block 314), customer 2 (block 316), and customer 3 (block 318). The group ID may be created for multi-party shopping, for example family shopping. The group ID may be hashed and stored in a blockchain.

The group ID may be an ID shared by the group members. That is, each member of the group uses this ID to log into an account or conduct transactions, for example, paying for products.

Alternatively, each member of the group may have their own ID for the retailer. Each member's ID may be linked to the group ID. That is, when a member logs into the retailer using their own ID, the group ID can be automatically associated to identify the member is one member of the group.

The disclosed system may obtain biometric data of each member of the group, for example, by scanning a portion of the customer (block 320). The biometric data may include, but is not limited to, iris, fingerprint, palm print, hand geometry, and facial images (block 322). The disclosed system may further hash the scanned biometric data to create a hash corresponding to the scanned biometric data (block 324). The generated hash may be stored on a remote server (e.g., a cloud-based database server) or a local server or computing device, or on the blockchain.

The hash may be linked to the group ID (block 326). When a member of the group conducts a transaction at the retailer, biometric data of the member may be collected, for example, by scanning the group member using their smart phone or by scanning the group member at a POS of the retailer. The collected biometric data may be hashed and compared with the biometric data of the group member that is stored on the blockchain or a server, such that the group member may be authenticated.

In some embodiments, two factor authentication of the group member may be used. For example, in addition to the biometric data of the group member, a question may be asked for the group member. The answer to the question may be stored together with the biometric data on the blockchain. Alternatively, a phrase may be spoken by the group member as a second factor. As such, the group member can be authenticated by both the biometric data and the question or phrase.

In some embodiments, group rules may be established and stored on the blockchain or the server (block 328). The group rules can be linked to the group ID. In an example of family shopping, the group rules may include "child is not allowed to buy certain products without parental approval," "authentication is needed to complete this transaction," "a product less than 20 $ is automatically approved," etc.

Registration of the customer can be completed (block 330).

Figure 4:
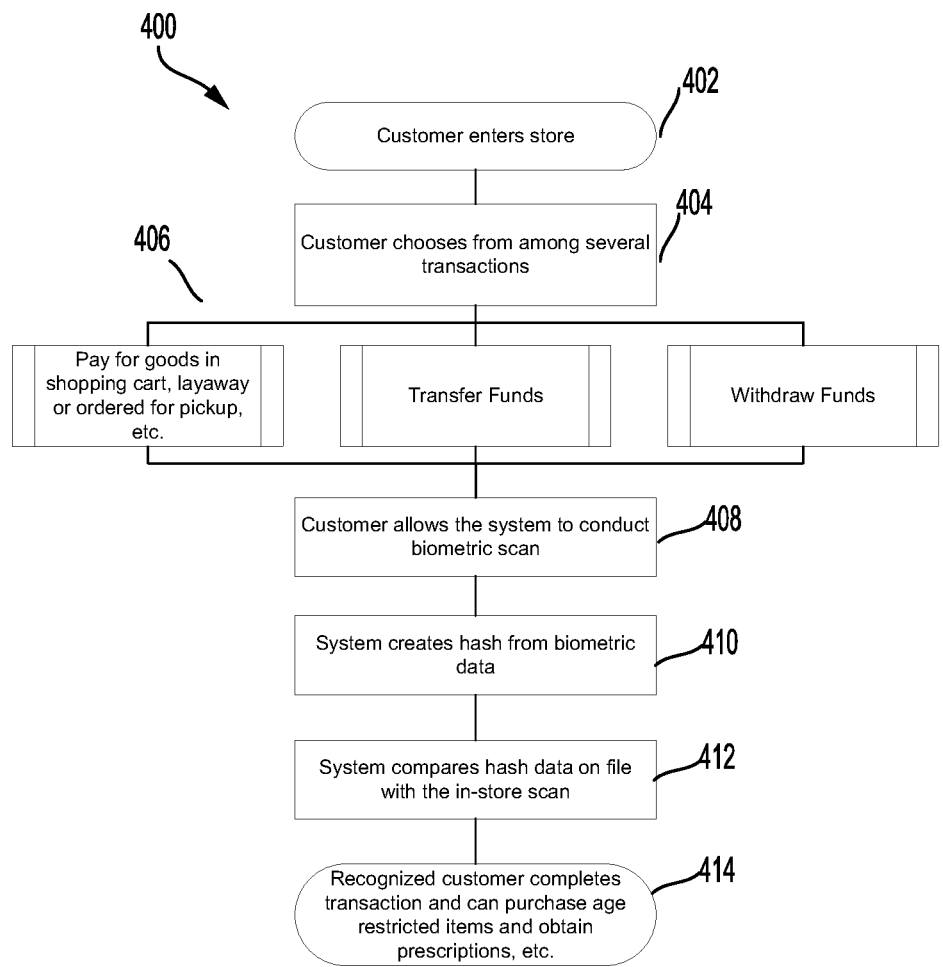
FIG. 4 illustrates a block diagram for a logic flow of biometric data authentication according to one embodiment.

FIG. 4 illustrates a block diagram 400 for a logic flow of biometric data authentication according to one embodiment. In this example, a customer has already registered with a digital credit system of a retailer store, and may go to the retailer store for conducting transactions (block 402). The customer may choose from among several transactions (block 404). The transactions to be chosen from may include "pay for goods in shopping cart, layaway or ordered for pickup, etc." "transfer funds" or "withdrawn funds" (block 406). After choosing one or more transactions, the customer may be authenticated by allowing the system to perform biometric scan (block 408). For example, the system may scan iris, fingerprint, palm print, hand geometry, and/or facial images. The system may then create a hash from the scanned biometric data (block 410). The newly generated hash may be compared with a hash that has been stored on file, for example on a remote database server (block 412). If the newly generated hash is determined to match with the hash that has been stored on file, the customer can be authenticated. The customer may then complete the chosen transactions, and can purchase age restricted items and obtain prescriptions, etc. as appropriate (block 414). If the newly generated hash is determined not to match with the hash that has been stored on file, the customer may be denied to complete the selected transactions, or may be asked to provide additional verification information. The customer may also be asked to perform an additional scan for the biometric data.

In some embodiments, the biometric data may act as a virtual government-issued ID to be used for identifying a customer when the customer conducts transactions in a retail store. For example, presently, the customer may be asked to show a photo ID when picking up an order. With the biometric data being registered with government, such biometric data can perform function of the photo ID. As such, biometrics may be used as a way for individuals to register with some state or federal entity which then would authenticate the registered biometric data against what is scanned in retail stores. Such that the individual can be identified when the individual conducts transactions at the retail store. The biometric data and related information may be stored at a central depository for customers who are shopping in any store in the country. Via an application programming interface (API) of the central depository, the stores would then authenticate the scanned biometric data against the registered biometric data. The user may then be allowed to do what they need to do with the corporate entity after that. That may include any financial transaction.

The systems and methods disclosed herein may also be used for a regular purchase transaction. For example, a hashed output from a combination of multi-factor input may just be a credit card number, or an internal unique number that assigned to a user. It may also be a digital way of accessing a user's passport, digital passcode, digital Pay or digital credit card.

Figure 5:
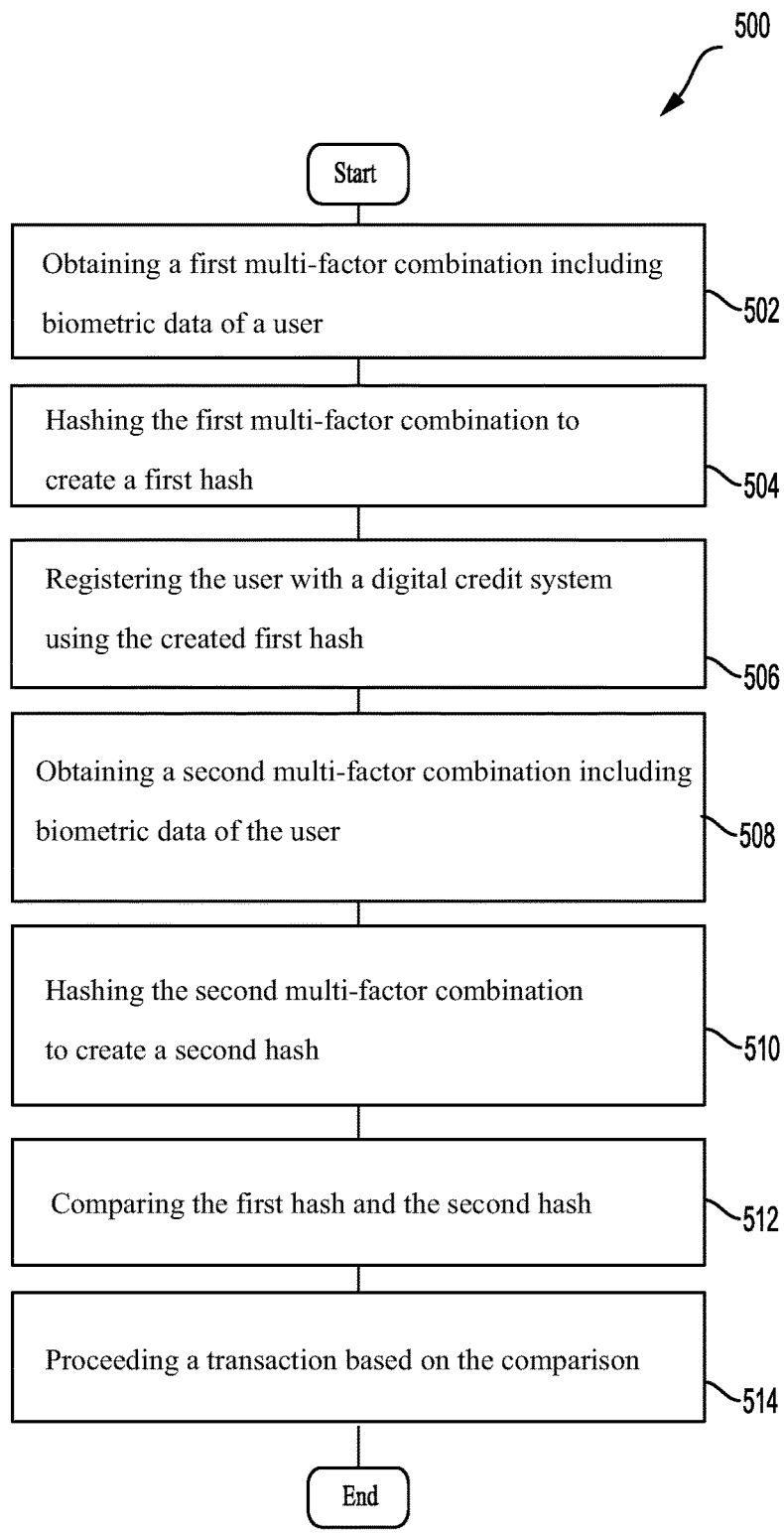
FIG. 5 illustrates an exemplary method embodiment according to one embodiment.

Methods that can be implemented in the above-described systems are also provided in this disclosure. FIG. 5 illustrates an exemplary method embodiment 500 which can be performed by a computing device, such a smart device, server, or any other computing device configured to perform according to the concepts disclosed herein. The method 500 can be provided for a digital credit system based on biometric data, and may include the following steps.

In step 502, a first multi-factor authentication including biometric data of a user is obtained. The multi-factor authentication may include a phrase or sentence spoken by the user, biometric data of the user, and/or a touch identification (ID) of the user. The phrase or sentence can be recorded and processed by microphone hardware and related applications configured on a computing device, for example a smart phone. The touch ID may be a pin code for unlocking a touch screen of the computing device. The biometric data can be iris, fingerprint, palm print, hand geometry, and facial images, which may be obtained via hardware (e.g., fingerprint scanner or a camera) and software on the computing device.

In step 504, the first multi-factor authentication is hashed to create a first hash. The first multi-factor authentication can be an input to a hash algorithm to hash out the first hash. The created hash may be a private key for the user. The hash algorithm may be any suitable algorithm that is used in the field.

In step 506, the user is registered with a digital credit system using the created first hash. The digital credit system may be a digital currency system managed by a bank, a financial institution, or a retailer. The first hash is associated with an account of the user in the digital credit system.

In step 508, a second multi-factor authentication including biometric data of the user is obtained. For example, when the user wants to conduct transactions in the retail store, the user may be required to provide a multi-factor authentication. The multi-factor authentication may include a phrase or sentence spoken by the user, biometric data of the user, and a touch identification (ID) of the user. The phrase or sentence can be recorded and processed by microphone hardware and related applications configured on a computing device, for example a POS machine in the retailer store. The touch ID may be a pin code for unlocking a touch screen of the computing device. The biometric data can be iris, fingerprint, palm print, hand geometry, and/or facial images, which may be obtained via hardware (e.g., fingerprint scanner or a camera) and software on the computing device.

In step 510, the second multi-factor authentication is hashed to create a second hash. The second multi-factor authentication can be an input to the hash algorithm to hash out the second hash. The second hash may not be stored anywhere on the network.

In step 512, the second hash is compared with the first hash. The second hash may be received and transmitted to a computing device where the first hash is stored. Alternatively, the first hash may be retrieved from the computing device. The first hash and the second hash are then compared.

In step 514, the user may proceed with a transaction based on the comparison. For example, if the second hash is determined to match with the first hash that has been stored on file, the user can be authenticated and may be allowed to complete the transaction, and can purchase age restricted items and obtain prescriptions, etc. as appropriate. If the second hash is determined not to match with the first hash that has been stored on file, the user may be denied to complete the selected transactions, or may be asked to provide additional verification information. The user may also be asked to scan one more time for the biometric data.

Figure 6:
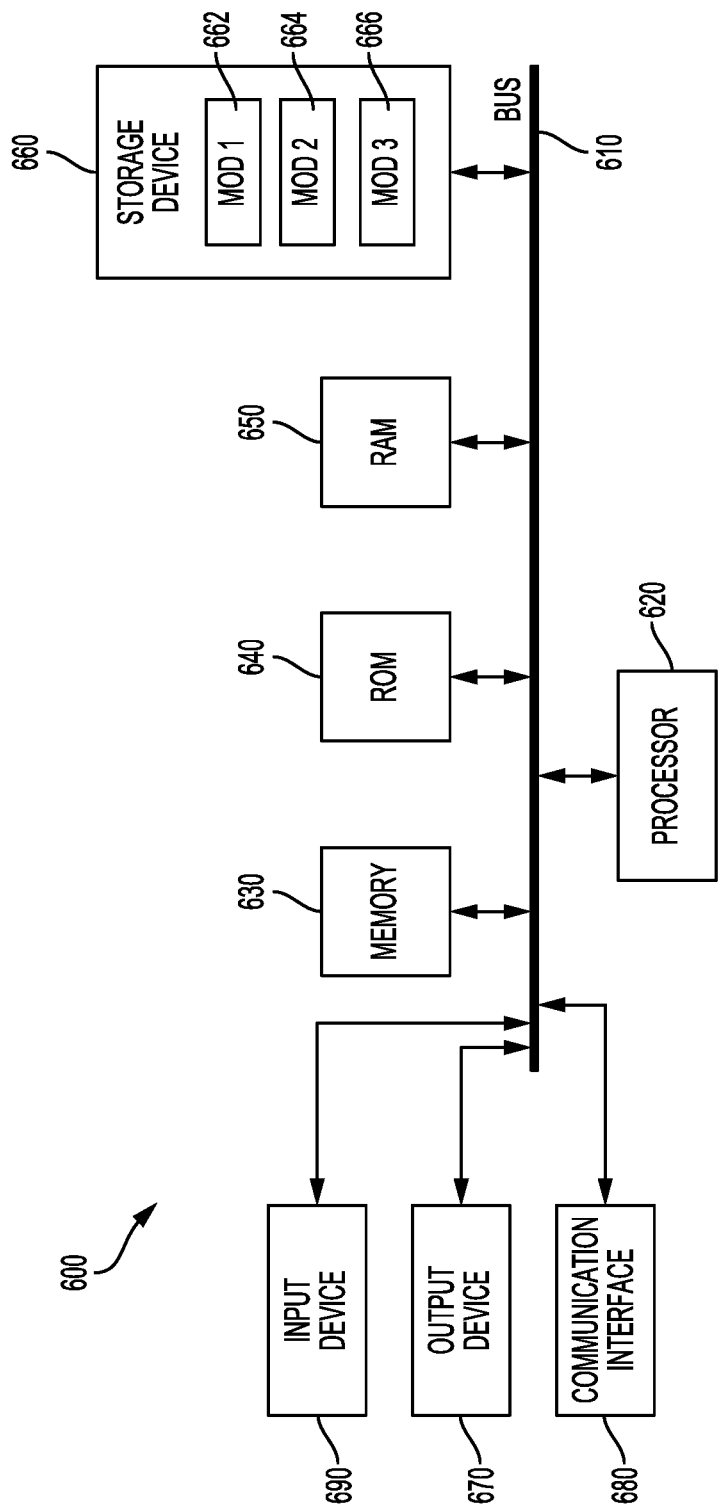
FIG. 6 illustrates an exemplary computer system according to one embodiment.

An exemplary computing system is provided in FIG. 6 that may be used to implement or part of the disclosed systems and methods. With reference to FIG. 6, an exemplary system 600 can include a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for a multi-party transaction, comprising:
a processor; and
a non-transitory computer-readable storage medium having instructions stored which, when executed by the processor, cause the processor to perform operations comprising:
a first computing device having a first biometric data capturing unit and configured to:
capture first biometric data of a first user via the first biometric data capturing unit, the first user being a customer seeking to purchase a product;
receive a first authentication factor including the first biometric data of the first user;
hash the first authentication factor to generate a first hash;
initiate the multi-party transaction using the first hash, a second computing device having a second biometric data capturing unit and configured to:
capture second biometric data of a second user via the second biometric data capturing unit, the second user having a first level of authority to authorize the purchase of the product;
generate a second authentication factor including the second biometric data of the second user;
hash the second authentication factor with the first hash to generate a second hash;
respond to the multi-party transaction using the second hash, and a third computing device having a third biometric data capturing unit and configured to:
capture third biometric data of a third user via the third biometric data capturing unit, the third user having a second level of authority to authorize the purchase of the product;
generate a third authentication factor including the third biometric data of the user; and
hash the third authentication factor with the second hash to generate a third hash;
process the multi-party transaction using the third hash, wherein:
the first, second and third users are involved in the multi-party transaction;
the first, second, and third biometric data each includes at least one of: an iris, fingerprint, a palm print, a hand geometry, and a facial image;
initiation of the multi-party transaction using the first hash is stored in a first block of a blockchain;
response to the multi-party transaction using the second hash is stored in a second block of the blockchain; and
processing of the multi-party transaction using the third hash is stored in a third block of the blockchain.

2. The system of claim 1, wherein:
the first, second, and third authentication factors each further includes at least one of: a phrase or sentence spoken by the corresponding first, second, and third user, and a touching identification of the corresponding first, second, and third user; and
the first, second, and third computing device is each further configured to capture at least one of: the phrase or sentence spoken by the corresponding first, second, and third user, and the touching identification of the corresponding first, second, and third user.

3. The system of claim 1, wherein the first, second, and third biometric data capturing unit each is at least one of: a fingerprint scanner, and a facial recognition device.

4. The system of claim 1, wherein the first, second, and third hash each is not stored on the corresponding computing device.

* * * * *